United States Patent [19]

Aleckner, Jr. et al.

[11] Patent Number: 4,945,005
[45] Date of Patent: Jul. 31, 1990

[54] THERMOPLASTIC COMPOSITIONS AND ARTICLES MADE THEREFROM

[75] Inventors: John F. Aleckner, Jr., Arlington; David J. Cherry, Grapevine; Lee R. Spencer, Jr., Arlington, all of Tex.

[73] Assignee: Dexter Corporation, Windsor Locks, Conn.

[21] Appl. No.: 387,407

[22] Filed: Jul. 28, 1989

Related U.S. Application Data

[63] Continuation of Ser. No. 32,641, Mar. 31, 1987, filed as PCT US86/00315 on Feb. 21, 1986 which is a continuation-in-part of Ser. No. 703,833 filed Feb. 19, 1986, abandoned.

[51] Int. Cl.$^5$ ............... C08L 23/26; C08L 23/04; C08L 33/02; C08K 3/00; C08K 3/34
[52] U.S. Cl. ................... 428/500; 524/451; 524/504; 524/522; 525/78; 525/196; 525/211; 525/221
[58] Field of Search ............ 525/221, 78, 196; 524/451; 428/500

[56] References Cited

U.S. PATENT DOCUMENTS

| | | | |
|---|---|---|---|
| 3,384,612 | 5/1968 | Brandt et al. | 525/221 |
| 3,410,928 | 11/1968 | Baum | 525/221 |
| 3,433,853 | 3/1969 | Earle et al. | 260/857 |
| 3,454,676 | 7/1969 | Busse | 525/221 |
| 3,465,060 | 9/1969 | Oldham | 260/857 |
| 3,869,422 | 3/1975 | Dawes et al. | 525/221 |
| 4,277,578 | 7/1981 | Yashimura et al. | 525/221 |
| 4,417,019 | 11/1983 | Yamamoto et al. | 524/517 |
| 4,420,580 | 12/1983 | Herman et al. | 525/221 |
| 4,584,348 | 4/1986 | Nagano | 525/221 |
| 4,600,748 | 7/1986 | Takagi et al. | 525/133 |
| 4,613,647 | 9/1986 | Yohaiyama et al. | 524/514 |

Primary Examiner—Carman J. Seccuro
Attorney, Agent, or Firm—Pennie & Edmonds

[57] ABSTRACT

Thermoplastic compositions and articles made therefore which have a high receptivity toward automotive paints comprises components (a), (b), (c), (d), and (e), wherein, for example 2%–25% (a) is a copolymer of an ethylenically unsaturated carboxylic acid and ethylene, 3%–50% (b) is an elastomer comprising an ethylene-alpha-olefin copolymer, 0%–55% (c) is a crystalline homopolymer or copolymer of propylene, 5%–50% (d) is an inorganic filler, and 10%–35% (e) is polyethylene or a copolymer of ethylene and an alpha-olefin.

Such articles, when injection molded, exhibit flexural moduli in the range of 30,000 to 400,000 psi and have excellent paintability, a broad range of stiffness values and high impact and tensile strengths suitable for automotive applications such as bumpers and facias and wheel covers.

27 Claims, No Drawings

THERMOPLASTIC COMPOSITIONS AND ARTICLES MADE THEREFROM

CROSS-REFERENCE TO RELATED APPLICATIONS

This is a continuation of application Ser. No. 032,641 filed Mar. 31, 1987, now abandoned, which is a continuation-in-part of international application No. PCT/US86/00315 filed Feb. 19, 1986 which in turn is a continuation-in-part of application Ser. No. 703,833 filed Feb. 21, 1985, now abandoned.

BACKGROUND OF THE INVENTION

Technical Field

This invention relates to thermoplastic polymer blends and shaped articles made therefrom, e.g., by injection molding, which are receptive and adherent to preparative, protective and/or decorative coatings, e.g., automotive paints. (The term "paint" as used herein includes all types of coatings such as primers, surface treatments, adhesives, sealants, enamels, paints and the like which can be applied to the surface of an article made from the compositions of the present invention.)

Description of Background Art

Polymer blends which can be formed or shaped into lightweight and durable articles useful, for example, as automobile parts, toys, housings for various types of equipment, and the like are well known in the art. Unfortunately, with polymer blends derived from components such as polyethylene, polypropylene and rubber, it is difficult to paint articles formed therefrom so that the paint securely and durably adheres to the surface. The problem of paint adhesion is of particular concern in the case of articles made of blends derived from thermoplastic olefin ("TPO") compositions of the type disclosed, for example, in Kawai, U.S. Pat. No. 4,480,065 and Fukui et al., U.S. Pat. Nos. 4,412,016 and 4,439,573 which are incorporated herein by reference.

In particular, TPO compositions which are mechanical blends of synthetic rubber and polyolefins, such as polypropylene and polyethylene, are used for fabricating lightweight and durable products for use in the automotive industry and in various other applications. Because articles made from TPO compositions have gained acceptance in the automotive industry as substitutes for steel bumpers, body parts and the like, it is important to be able to paint such articles so that there is little visible difference between them and the metallic parts of the vehicle.

The utility of TPO blends would be expanded in automotive and other applications if the adhesion of paints to articles made from such blends were improved. Such other applications include flocked sheets for trunk liners and decorative rub strips which are currently being made of other plastics such as polyvinylchloride ("PVC") to which paints adhere better.

Unfortunately, articles made from polymer compositions containing substantial amounts of polyethylene (and/or polypropylene) and rubber are often difficult to paint so that the paint adheres permanently to them. In particular, most paints will either not initially adhere to the product or else peel or chip away under normal field use or high humidity conditions, or in the presence of fuels or solvents.

Various methods have been tried to make articles having substantial amounts of polypropylene and/or rubber therein more paint receptive. The use of primers or adhesion promoters as chlorinated polyolefins, and plasma surface treatment or other electronic surface treatments are examples. However, these prior methods for increasing the paint receptivity of such articles are costly and time consuming. The use of chlorinated polymers to promote adhesion between the surface of the article and the paint as disclosed for example, in the aforementioned U.S. Pat. No. 4,439,573 is required in state-of-the-art automotive applications; but even so, the gasoline and solvent resistance of painted TPO parts pretreated in this way has only been marginally acceptable.

It is therefore apparent that a need exists for polymer compositions that can be used to form paint receptive, durable and lightweight shaped articles which do not require surface pre-treatment.

Polymer blends derived from TPO have been used for film and packaging applications, as taught, for example, in Yoshimara et al., U.S. Pat. No. 4,454,303. Also, while prior compositions of polyolefins and copolymers of ethylene and ethylenically unsaturated carboxycic acids and ionomers have been used for improved ink adhesion and lacquer bonding, such compositions did not possess the physical properties needed for molding applications nor do they possess the high humidity resistance or high level of paint adhesion of the blends of the present invention. The present invention features the use of components which makes possible blends that are particularly suitable for injection molding. Such blends, when molded, exhibit remarkable and unexpected improvements in receptivity toward certain paints, including automotive paints, without sacrificing the other desirable properties of TPO blends.

Accordingly, it is an object of the present invention to provide polymer blends that are useful for making lightweight, durable articles having paint receptive and adherent surfaces.

Another object of the invention is to provide lightweight and durable shaped articles made from polymer blends according to the invention and having paint receptive surfaces.

Another object is to provide durably painted shaped articles made from polymer blends according to the invention. Another object is to provide methods for producing compositions in the form of polymer blends, shaped articles made from such blends having paint-receptive surfaces, and durably painted shaped articles.

Yet another object is to provide coating systems, coating additives and surface treatments suitable for use with the compositions and articles of the invention.

These and other objects of the invention as well as the advantages thereof can be had by reference to the following description and claims.

SUMMARY OF THE INVENTION

The foregoing objects are achieved according to the present invention by the discovery of compositions useful for forming functional and decorative shaped articles such as automobile bumpers, bumper skirts, trims, wheel covers, fenders, and the like that are coatable with paint systems including those used in the automotive industry, such painted articles exhibiting excellent paint appearance and durability.

More particularly, the invention includes thermoplastic compositions comprising:

(a) about 2 to 25 weight percent of a copolymer having a melt index of between 0.5 and 1500 and derived from
   (i) about 70 to 95 weight percent of ethylene and
   (ii) about 5 to 30 weight percent of an ethylenically unsaturated carboxylic acid;
(b) about 3 to 50 weight percent of an elastomeric copolymer derived from
   (i) ethylene and
   (ii) a $C_3$ to $C_{12}$ alpha-olefin;
(c) about 0 to 55 weight percent of a crystalline polymer having a melt flow rate of up to about 30 and selected from
   (i) a homopolypropylene,
   (ii) a polypropylene onto which has been grafted up to about 12 weight percent of an ethylenically unsaturated carboxylic acid, and
   (iii) a copolymer of
      (1) propylene and
      (2) up to about 20 mole percent of a $C_2$ to $C_{12}$ alpha-olefin;
(d) about 5 to 50 weight percent of an inorganic filler; and
(e) about 10 to 35 weight percent of
   (i) homopolyethylene or
   (ii) a copolymer of
      (1) ethylene and
      (2)
         (A) a $C_3$ to $C_{12}$ alpha-olefin, or
         (B) a salt of an unsaturated carboxylic acid, or
         (C) an ester of an unsaturated carboxylic acid.

Component (a) is a thermoplastic copolymer of an ethylenically unsaturated carboxylic acid and ethylene having a melt index ("MI") (ASTM D-1238 @190° C.) range of 0.5 to 1500 with the ethylenically unsaturated carboxylic acid comonomer weight percent ranging from 5 to 30 weight percent. Additional monomers can be polymerized into this copolymer. These copolymers can also contain low levels of metallic salts of unsaturated carboxcylic acids such as sodium or zinc salts.

Component (b) is a thermoplastic elastomeric random copolymer of ethylene with at least one alpha-olefin having from 3 to 12 carbon atoms such as polypropylene and 1-butene. This elastomer can be further copolymerized with a small amount of one or more polyunsaturated hydrocarbons such as 1,4-butadiene, isoprene, 1,4-hexadiene, ethylidene norbornene, and the like. In these component (b) copolymers, the ethylene content desirably falls in the range of from 20 to 90 mole percent, preferably from 40 to 90 mole percent, and most preferably from 65 to 85 mole percent. The elastomer can also be selected from copolymers of styrene and butadiene. Less preferred but also suitable are polyisoprene, bromobutyl rubber, and nitrile rubber. A combination of these elastomers can also be used.

The density of these elastomeric copolymers should be between about 0.85 and 0.92 g/cm$^3$ and typically is about 0.90 to 0.92 g/cm$^3$, with a density of 0.91 g/cm$^3$ being especially preferred. The crystallinity in the rubbery zone generally ranges from substantially amorphous to low partial crystallinity on the order of not more than 30% crystallinity as determined by X-ray analysis.

Especially preferred as component (b) is a copolymer of ethylene and propylene and which can, if desired, have incorporated therein a small amount of a diene. The elastomer possesses a melt index (ASTM D-1238 @190° C.) of from 0.1 to 10, preferably from 0.2 to 6.

Component (c) is a crystalline homopolymer or one or more crystalline copolymers of propylene with to about 20 mole percent ethylene or other alpha-olefin having up to about 12 carbon atoms. For applications where large parts are injection molded, the melt flow rate ("MFR") (ASTM D-1238 Condition L @230° C.) of component (c) is preferably between 5.0 and 30.0, preferably from about 8.0 to 20.0. For small parts, MFR's of less than 1.0 are suitable.

In some cases random and block copolymers of propylene and ethylene can be used to modify physical properties. A particularly useful example of this is polypropylene which has been graft polymerized with up to about 12 weight percent acrylic acid or methacrylic acid. Such copolymers assist dispersing of the components in the blend and increase the flexural moduli of articles molded therefrom.

Component (d) is an inorganic finely divided filler such as talc, mica, glass, or silica, or mixture of fillers. Talc and milled glass are the preferred fillers.

Component (e) is a polyethylene or a copolymer of ethylene produced by a medium or low pressure process and having a density ranging from 0.88 to 0.97 g/cm$^3$. Suitable copolymers are commercially available. The comonomers can be alpha-olefins having from 3 to 12 carbon atoms. Other suitable ethylene copolymers are ionomers made by converting the carboxylic acid functional groups in copolymers of ethylene and ethylenically unsaturated carboxylic acids to metallic salts such as sodium or zinc salts, as typified by DuPont's Surlyn resins. Also suitable, albeit less desirable, are ethylene-ethyl acrylate copolymers. Component (e) desirably possesses a melt index in the range of 0.1 to 20.

The foregoing compositions of the present invention have excellent paintability, a broad range of stiffness values and high impact and tensile strengths suitable for automotive applications such as bumpers, fenders, facias and wheel covers. The polymer compositions of this invention can be molded or otherwise formed or shaped to produce articles that are lightweight, durable, and have surfaces that are paint receptive whereby the articles can be painted and the paint cured at temperatures exceeding 250° F. and the paint coat will adhere to the articles to produce a durable and attractive finish. Compositions formulated in accordance with the invention can withstand elevated temperatures as high as 250° F. and above. A composition withstands such a temperature when it does not thermally degrade, as by charring, or distort in shape to the point where it is not usable for its intended function (including fitting with other parts) at that temperature or when cooled down.

In addition to the aforementioned required components, other compatible polymers, fillers, reinforcing agents, pigmenting agents, stabilizers and the like can be added to the composition. For example, processing aids such as metal carboxylates, improve paint adhesion. Also found to improve paint adhesion is the use of titanate coupling agents on the fillers.

It has also been discovered that paints which adhere best to articles made of the present compositions are those containing active substituents which react with the carboxylic acid functional group of the ethylene-acrylic acid and ethylene-methacrylic acid copolymers of component (a). Examples of such active paint constituents include epoxy resins, carbodiimides, urea resins, melamine-formaldehyde resins, enamines, ketimines, amines, and isocyanates. These and other paint constituents capable of reacting with carboxylic acid functional groups are well known in the paint and coatings industry and have been used not only to impart adhesion of the paint to substrates but also to react with free carboxylic acid groups to prevent undesirable acid catalyzed reactions.

Polymer compositions useful for producing shaped, paint receptive motor vehicle parts such as wheel covers, for example, are molded from a blend of components (a), (b), (c), (d) and (e). Various other compatible polymers, fillers, reinforcing agents, stabilizers and pigment materials can be added to the polymer composition with the resulting polymer blend being formable (e.g., by injection molding) into shaped articles that have highly paint receptive surfaces.

The preferred component (a) copolymers are ethylene-acrylic acid copolymers ("EAA") and ethylene-methacrylic acid copolymers ("EMAA"). These include conventional ethylene and acrylic acid copolymers and ethylene and methacrylic acid copolymers, or mixtures or blends thereof. Such materials are usually produced by the free radical copolymerization of ethylene with acrylic acid or ethylene with methacrylic acid. The resulting copolymers have carboxylic acid groups along the backbone and/or side chains of the copolymer. Ethylene-acrylic acid copolymers or ethylene-methacrylic acid copolymers preferred for use in the invention have at least about 5 percent by weight of acrylic acid or methacrylic acid monomer units in the polymer chain. Copolymers having lower acid content can be also be used, although this is less desirable; for example, higher homologs of the above described ethylene-methacrylic acid copolymers such as ethylene-ethacrylic acid or ethylene propacrylic acid copolymers can be used.

The melt index of the ethylene acrylic acid or ethylene-methacrylic acid copolymers is in the range of about 0.5 to 1500. The preferred melt index is between about 5 and 300, and most preferably between about 10 to 300. A melt index between about 5 and 300 is preferred for large part injection molding applications. For applications where small parts are molded and/or more tensile strength or impact strength is needed, melt indices of 0.5 to 5 are preferred. For such small part applications the melt index of components (b), (c), and (e) should also be low to facilitate dispersion during compounding.

Component (a) is required at a minimum of about 2 weight percent and a maximum of about 25 weight percent to achieve acceptable initial paint adhesion. The preferred range is 5% to 20% for good humidity resistance. Above 25%, impact strength of most blends is adversely affected.

Component (b), the elastomer component of the instant invention, can be any elastomer that is compatible or can be rendered compatible with the other ingredients of the blend. For example, the elastomer component can be ethylene-propylene, ethylene-propylenediene monomer, styrene-butadiene-styrene, acrylonitrile-butadiene, bromobutyl rubber, etc. The term "compatible" is intended to mean that when the components of the blend are combined, the resultant blend can be molded, extruded or otherwise formed or shaped into commercially useful articles.

A wide range of elastomers can be used. The primary requirements are (1) the elastomer should be of a low enough viscosity so that it can be dispersed into component (e) and/or component (c). The use of fillers and coupling agents renders chemically dissimilar components compatible enough to be suitable in many cases. Elastomers which offer the best compromise of cost and performance are the ethylene-propylene rubbers and styrene-butadiene rubbers. The optimum melt viscosity of the elastomer varies with the melt viscosity of the other components. Generally, as the melt indices of components (a), (c), and (e) are reduced, so should the melt index of the elastomer be reduced to maintain an optimum balance of paint adhesion and physical properties.

The following is a list of commercially available elastomers which are suitable for use in the invention:

| Name | Type | Supplier |
|---|---|---|
| Polysar 306 | Ethylene-Propylene | Polysar |
| Polysar X2 | Bromobutyl Rubber | Polysar |
| Krynac 19.65 | Nitrile Rubber | Polysar |
| Nordel 2722 | Ethylene-Propylene-Hexadiene | DuPont |
| Vistalon 719 | Ethylene-Propylene | Exxon |
| Kraton G 11650 | Styrene-Ethylene-Butadiene Styrene | Shell |
| Stereon 840 A | Styrene-Butadiene | Firestone |
| GE 7340 | Hydrogenated Styrene-Butadiene | Goldsmith & Eggleton |
| Natsyn 2200 | Polyisoprene | Goodyear |

The elastomer component is used at levels ranging from 3 to 50 weight percent. The preferred range is about 10 to 40 weight percent. Below 3 weight percent paint adhesion and durability are poor.

The polypropylene component (c) of the present invention includes conventional polypropylenes having melt flow rates (ASTM D-1238 Condition L @230° C.) of desirably from about 0.1 to about 30 and preferably from about 0.8 to 30. Polypropylenes having melt flow rates in this range can be blended effectively with the other components to produce polymer compositions that can be effectively molded or extruded, or otherwise shaped to produce low cost, lightweight articles that are paint receptive. The polypropylene component of the invention can be either a homopolymer of propylene or it can be a copolymer of propylene. When a copolymer of propylene and ethylene is utilized as the polypropylene component, the copolymer can either be a random or block copolymer or a graft copolymer such as described above.

When the polypropylene component of the invention is increased beyond about 75 weight percent of the total composition, initial paint adhesion becomes unacceptable, although physical properties for most applications begin to deteriorate beyond about 55 weight percent polypropylene. For some random copolymers of polypropylene and ethylene, good initial adhesion can be achieved up to 85 weight percent thereof in the blend; however, the physical properties begin to suffer beyond 50–55 weight percent of the blend.

The minimum level of component (c) is dictated by the oven bake temperature. To withstand a bake temperature of 180° F., no polypropylene is required if HDPE is used in component (e). Additionally, the HDPE may be crosslinked by electron beam radiation or by chemical means to reduce sagging or distorting at high bake temperatures. To withstand oven bake temperatures of 250° F. most compositions will require at least about 30% of component (c) with a minimum of 9% being homopolymer or 13% being a highly crystalline block copolymer or a graft copolymer.

The filler, component (d) can be used from about 5 to 50 weight percent. Basic fillers or fillers which can react with the carboxylic acid functional groups tend to reduce paint adhesion. Neutral or non-reactive fillers such as mica, glass, silica talc, or phosphate fiber do not suffer these drawbacks and are able to control flexural modulus and to aid in dispersion of the various components. Talc is the preferred filler because of its ability at low concentrations to impart high flexural modulus to injection molded articles.

The filler is necessary to achieve maximum paint adhesion and resistance to humidity. The preferred range for achieving acceptable humidity resistance of painted parts is 5-50 weight percent. Most preferred for overall properties is 8 to 45 weight percent.

Polyethylene and polyethylene copolymers of component (e) are used primarily to help disperse the rubber and the ethylene and ethylenically unsaturated carboxylic acid copolymers, and also to help achieve desirable physical properties such as tensile strength and impact strength. This component is also necessary to achieve acceptable humidity resistance. For most automotive applications, a weight range of 5 to 40 weight percent is preferred. Most preferred is 5 to 25 weight percent. For high flexural modulus products, HDPE is preferred. For articles having low flexural moduli, ionomer resins are preferred.

The melt index of component (e) is between about 0.1 and 20, and preferably between about 0.8 and 2.0 for injection molding applications.

Various other materials can be incorporated into the polymer blends of the invention. Such materials can include other compatible polymers, pigments, dyes, processing aids, antistatic additives, surfactants and stabilizers generally used in polymeric compositions. Particularly useful for improving humidity resistance of these blends are styrene-maleic anhydride copolymers and a wide variety of cationic surfactants. These minor components are each used at less than 2.0 weight percent and preferably less than 1.0 weight percent. They afford greater latitude for optimizing physical properties while also maintaining good paint adhesion.

It will of course be understood that mixtures of various materials that fall within the aforementioned recitations of components and proportions can also be used. For example, the polypropylene component of the invention can be a blend or a mixture of various polypropylenes such as a blend of homopolypropylene with various propylene copolymers.

The blending or mixing of the various components of the invention can be carried out using conventional mixing equipment such as Banbury mixers, as well as extrusion mixing equipment. It will be understood that the polymer blends of the instant invention can be blended and then pelletized for easy storage, shipment and subsequent use.

The polymer blends of the invention can be made into useful articles by any known means such as by extrusion, injection molding, blow molding, or thermoforming. The preferred method is injection molding.

Photomicrographic analysis of cross-sections of injection molded articles made from the present polymer blends indicates the existence of a polymer matrix having co-continuous phases within it. Without wishing to be bound by theory, it is believed that such morphology stems from the relatively low levels of crystalline polypropylene and high levels of filler in these blends. Polymer blends containing low amounts of filler or which have been inadequately mixed exhibit a laminar morphology in a to the co-continuous phases. This laminar morphology, which is usually observed in photomicrographs of surfaces of impacted specimens, gives acceptable paint adhesion and physical properties only if the thickness of the individual layers or lamellae remains small. When the thickness of such layers becomes greater, impact strength and paint adhesion are both reduced. The preferred morphology is believed to be a combination of co-continuous and laminar phases with the latter being kept to a minimum. This type of morphology is achieved and can be controlled by the use of fillers and the careful selection of the viscosities of the polymer components.

Once the blends have been formed into shaped articles, the latter can be coated with conventional paints, preferably those containing ingredients that will react sufficiently with the carboxylic acid groups in the blend or be of sufficiently high molecular weight so as to anchor themselves in the polymer matrix of the blend. As mentioned previously, such components can include melamine-formaldehyde resins, epoxides, carbodiimides, enamines, ketimines, amines, isocyanates or any material that has functional groups capable of reacting with carboxylic acids groups.

The shaped articles can also be pre-treated with additives that will react with the carboxylic acid prior to painting for the purpose of improving paint adhesion. Such treatment can include primers such as epoxy or urethane primers and their components. The paint will adhere to the article to form a durable and tough finish that will resist peeling, chipping, high humidity conditions and gasoline. It has been found that the polymer blends of this invention are especially useful for producing finished articles that are painted with urethane-polyester paints, such as PPG Industries Durethane 700 HSE (High Solids Enamel).

The preferred paint system is cured with melamine-formaldehyde cross-linking agents such as Cymel 303 made by American Cyanamid Corp., or other urea resins. Such paints require baking temperatures of about 250° F. Although lower bake temperatures can be used to crosslink the coating, a minimum temperature of 250° F. is usually required to effect the reaction between the carboxylic acid of the substrate and the malamine formaldehyde resin of the paint.

The composition of the paint system is important. Certain additives pigments tend to poison the reaction by being absorbed onto the acidic substrate and thereby preventing the desired reaction from occurring. Uniform results are achieved by using a primer having none of the undesirable additives. The primer can then be top-coated with a variety of paint systems.

If the paint system is chosen carefully, a single coating (without primer) can achieve excellent results on articles made according to the invention.

DESCRIPTION OF PREFERRED EMBODIMENTS

The following three formulations illustrate polymer blends of the present invention having different flexural moduli:

| | A | B | C |
|---|---|---|---|
| 12 MFR polypropylene | 12.0 | 11.1 | 2.0 |
| ethylene - methacrylic acid copolymer, 25 MI | 13.0 | 13.0 | 10.0–3.0 |

-continued

|  | A | B | C |
| --- | --- | --- | --- |
| EP rubber, low ethylene | 22.0 | 17.0 | 12.0–5.0 |
| styrene-maleic anhydride copolymer | 0.6 | 0.6 | 0.6 |
| high density PE | 5.0 | 20.0 | 20.0 |
| talc | 10.0 | 20.0 | 45.0 |
| 2¼% ethylene-propylene random copolymer | 19.0 | 10.0 | 0.0 |
| acrylic acid grafted PP | 8.0 | 8.0 | 10.0–20.0 |
| nucleating agent | 0.15 | 0.15 | 0.15 |
| quaternary ammonium surfactant | 0.3 | 0.3 | 0.3 |
| antioxidants | 0.4 | 0.4 | 0.4 |
| titanate coupling agent | 0.025 | 0.0 | 0.0 |
| Surlyn 9020 | 10.0 | 0.0 | 0.0 |

The formulation in column A represents polymer blends having flexural moduli ranging from 40,000 psi to 90,000 psi. Column B is for a polymer blend having moduli ranging from 90,000 psi to 190,000 psi. Column C illustrates blends having moduli ranging from 190,000 psi to about 300,000 psi.

To demonstrate the paint receptive properties of articles made from the polymer blends of this invention, several non-limiting examples are given below. In all of the examples, the various polymer blends are prepared by combining the stated components in the amounts indicated and then subjecting them to intensive mixing in a Banbury mixer or in an extruder. After the mixing step, the blends are injection molded to form test plaques measuring approximately 3"×6"×0.125".

In preparing the test plaques for painting, the surfaces of the plaques are first wiped clean with methylethylketone (MEK). After the MEK has evaporated from the surface, the test plaques are painted with PPG Industries Durethane HSE 9440 enamel by spraying the paint in two passes to coat entirely the plaque surface with each pass. A 1.5 to 2 minute flash time is allowed between each of the passes. The dry film thickness of the paint is between about 1.5 to about 1.8 mils. Durethane HSE 9440 paint is a high solids elastomeric enamel that is composed of a polyester urethane backbone. Following the application of both coats of the paint to the surface of the test plaques, the plaques were cured by baking at 250° F. for 30 minutes.

Four separate tests are made to evaluate the paint receptive qualities of the test plaques.

TEST I

In the first test, paint adhesion after 24 hours is evaluated by taking a test plaque and, using a razor knife, cutting X-shaped cross hatch marks through the paint film to the surface of the plaque. Thereafter, Permacel P-703 tape is applied to the cut area while pressing the tape down with a fingernail or by rubbing the backside of the tape with a pencil eraser. The tape is then removed by rapidly pulling the tape at a 90° angle to the surface to the test plaque. Following the removal of the tape, the plaque surface is examined for paint removal. The number of squares removed divided by the total number of squares in the cross hatch area (usually 25) is reported. This first test is used as a quick screening method to evaluate various blends and various paint systems.

TEST II

In the second test to evaluate paint adhesion, a solvent resistance test is utilized. This solvent resistance test has been referred to in the automotive industry as the "Fisher-Body" method. In conducting the test, a painted plaque is immersed in a mixture of 55% naphtha and 45% toluene. Following immersion in the naphtha-tolulene mixture for 10 seconds, the test plaque is removed and dried in the air for 20 seconds. During the drying cycle, scratches with a fingernail or dull knife are attempted over the painted surface. The solvent resistance test is repeated for a number of cycles wherein the test plaque was alternately dippled in the naphtha-toluene for 10 seconds and then allowed air dry for 20 seconds while the scratching is carried out. Any paint removal resulting from such scratching terminates the test. The results of the solvent resistance test are given in the number of cycles occurring until there is a removal of the paint from the test plaque.

TEST III

The third test evaluates the adhesion of paint to the polymer blends of this invention under conditions of high humidity using test plaques that were painted in accordance with the above-mentioned procedure. The painted plaques are placed in a humidity chamber that has been maintained at 100% humidity at 38° C. The plaques are removed after 96 hours of exposure and examined for blisters, dulling of paint or any change in paint appearance. Thereafter, a razor knife is used to cut X-shaped cross hatches through the paint film to the surface of the plaque and Permacel P-703 tape was applied to the cut area while pressing down with a fingernail or rubbing the backside of the tape with a pencil eraser. The tape is then removed by rapidly pulling the tape at a 90 degree angle to the surface of the test plaque. Any removal of the paint from the cut area is reported as a fraction of the total number of squares in the cross hatch area. In carrying out this humidity resistance test, the examination of the appearance of the plaques and adhesion of paint thereto is carried out within 10 minutes after the removal of the test plaque from the humidity chamber.

TEST IV

The fourth test measures the force in lbs./in. to peel a 1" wide strip of coating from the test plaques. The test is begun by pressing a 1" wide strip of tape onto the painted surface. A scribe along each side of the tape is made in the opposite direction of pull. The delamination of the paint from the plaque is initiated by raising the leading edge of the paint with a sharp metal blade. Once started, tape is attached to the backside of the delaminated paint and secured to the traversing clamp of an Instron unit. Using an Instron with a load cell of 0–20 lbs. the paint is pulled at a 90° angle to the plaque. Using coating thicknesses of 1.5–2.0 mils, values up to 5.0 lbs/in. are measured. Test I, a method used by the automotive industry to evaluate paint durability, gives paint delamination at adhesion levels up to 0.7 lbs/in. In some cases, however, paints that had adhesion values of only 0.3 lbs/in. passed Test I. This appears to be caused by the tendency of the razor blade to force the coating into some of the softer substrates, thereby making it more difficult for the tape to pull it free.

Using the automotive industry guidelines, adhesion levels of 0.8 lbs/in. or greater are considered as being highly durable.

In most of the following examples, it was not possible to separate the paint from the substrate by any means.

EXAMPLES

Chart I demonstrates the importance of the inorganic filler to achieving good humidity resistance of painted parts.

Chart II demonstrates the importance of the polyethylene and copolymers of ethylene for physical properties and for paint adhesion.

| CHART II | | | | | |
|---|---|---|---|---|---|
| Polypropylene 12 MFR Random Copolymer 2-4% Ethylene | 22.2 | 27.2 | — | — | — |
| Polypropylene 12 MFR Homopolymer | 9.0 | 9.0 | 55.2 | 50.2 | 35.2 |
| Ethylene-Propylene Elastomer, 1.5 MFR 70% Ethylene | 22.0 | 27.0 | 21.0 | 21.0 | 21.0 |
| Ethylene-Methacrylic Acid Copolymer, 25 M.I. Nucrel 925 | 13.0 | 13.0 | 8.0 | 8.0 | 8.0 |
| High Density Polyethylene 0.960 g/cc, 1.0 M.I. | 5.0 | 5.0 | — | 5.0 | 20.0 |
| Styrene-Maleic Anhydride Copolymer | 0.6 | 0.6 | 0.6 | 0.6 | 0.6 |
| Quaternary Ammonium Surfactant | 0.2 | 0.2 | 0.2 | 0.2 | 0.2 |
| Polypropylene Acrylic Acid Graft Copolymer | 8.0 | 8.0 | 5.0 | 5.0 | 5.0 |
| Talc | 10.0 | 10.0 | 10.0 | 10.0 | 10.0 |
| Suryln 9020 Ionomer Resin Copolymer of Ethylene | 10.0 | — | — | — | — |
| Gardner Impact −30° C., In. Lbs ASTM D-3029 | 320 | 280 | 280 | 200 | 240 |
| Tensile Strength, ⅛" Thick Bar, PSI | 1800 | 1600 | 2400 | 2300 | 2200 |
| Flexural Modulus, PSI ASTM D 790 | 71,000 | 65,000 | 150,000 | 147,000 | 141,000 |
| Peel Strength Test IV "NP" Means Paint Cannot Be Removed | NP | NP | NP | NP | NP |
| Solvent Resistance Test II | P | P | P | P | P |
| Humidity Resistance Test III | P | F Blisters | F Blisters | F Blisters | P |
| Initial Adhesion Test I | P | P | F(4) | F(2) | P |

| CHART I | | | | | | | | |
|---|---|---|---|---|---|---|---|---|
| Polypropylene 12 MFR Random Copolymer 2-3% Ethylene | 38.0 | 35.0 | 30.0 | 26.0 | — | — | — | — |
| Polypropylene 12 MFR Homopolymer | 12.1 | 12.1 | 12.1 | 12.1 | 42.2 | 37.2 | 32.2 | 22.2 |
| Ethylene-Propylene Elastomer, 1.5 MFR 70% Ethylene | 27.0 | 27.0 | 27.0 | 27.0 | 16.0 | 16.0 | 16.0 | 16.0 |
| Ethylene-Methacrylic Acid Copolymer, 25 M.I. Nucrel 925 | 17.0 | 17.0 | 17.0 | 17.0 | 13.0 | 13.0 | 13.0 | 13.0 |
| Milled Glass | — | 3.0 | 8.0 | 12.0 | — | — | — | — |
| High Density Polyethylene 0.960 g/cc, 1.0 M.I. | 5.0 | 5.0 | 5.0 | 5.0 | 20.0 | 20.0 | 20.0 | 20.0 |
| Styrene-Maleic Anhydride Copolymer | 0.6 | 0.6 | 0.6 | 0.6 | 0.6 | 0.6 | 0.6 | 0.6 |
| Quaternary Ammonium Surfactant | 0.3 | 0.3 | 0.3 | 0.3 | 0.2 | 0.2 | 0.2 | 0.2 |
| Polypropylene Acrylic Acid Graft Copolymer | — | — | — | — | 8.0 | 8.0 | 8.0 | 8.0 |
| Talc | — | — | — | — | 0 | 5 | 10 | 20 |
| Gardner Impact −30° C., In. Lbs ASTM D-3029 | 280 | 280 | 256 | 264 | 256 | 256 | 256 | 256 |
| Tensile Strength, ⅛" Thick Bar, PSI | 1,800 | 1,700 | 1,500 | 1,400 | 2,600 | 2,600 | 2,500 | 2,500 |
| Flexural Modulus, PSI ASTM D 790 | 58,000 | 63,000 | 59,000 | 58,000 | 135,000 | 140,000 | 145,000 | 150,000 |
| Peel Strength Test IV ("NP" Means Paint Cannot Be Removed) | NP | NP | NP | NP | NP | NP | NP | NP |
| Solvent Resistance Test II | >20 | >20 | >20 | >20 | >20 | >20 | >20 | >20 |
| Humidity Resistance Test III | Blisters Fail | Blisters Fail | Pass | Pass | Large Blis. | Large Blis. | Small Blis. | Pass |
| Intial Adhesion Test I | Pass | Pass | Pass | Pass | Pass | Pass | Pass | Pass |

Chart III demonstrates the importance of the melt index of the ethylene-methcrylic acid copolymer for optimizing paint adhesion in any one blend composition.

| CHART III | | | | | | | |
|---|---|---|---|---|---|---|---|
| Polypropylene 12 MFR Random Copolymer 2-4% Ethylene | 27.0 | 27.0 | 27.0 | 27.0 | 27.0 | 27.0 | 27.0 |
| Polypropylene 12 MFR Homopolymer | 10.0 | 10.0 | 10.0 | 10.0 | 10.0 | 10.0 | 10.0 |
| Ethylene-Propylene Elastomer, 1.5 MFR 70% Ethylene | 30.0 | 30.0 | 30.0 | 30.0 | 30.0 | 30.0 | 30.0 |
| Ethylene-Methacrylic Acid | 17.0 | — | — | — | 9.0 | 9.0 | 9.0 |

CHART III -continued

| | | | | | | | |
|---|---|---|---|---|---|---|---|
| Copolymer, 25 M.I. Nucrel 925 | | | | | | | |
| Ethylene-Acrylic Acid Copolymer 300 M.I. Primacor 5981 | — | 17.0 | — | — | 8.0 | — | — |
| High Density Polyethylene 0.960 g/cc, 1.0 M.I. | 5.0 | 5.0 | 5.0 | 5.0 | 5.0 | 5.0 | 5.0 |
| Styrene-Maleic Anhydride Copolymer | 0.6 | 0.6 | 0.6 | 0.6 | 0.6 | 0.6 | 0.6 |
| Quaternary Ammonium Surfactant | 0.4 | 0.4 | 0.4 | 0.4 | 0.4 | 0.4 | 0.4 |
| Ethylene-Methacrylic Acid Copolymer 14.0 M.I. Nucrel 714 | — | — | 17.0 | — | — | 8.0 | — |
| Ethylene-Methacrylic Acid Copolymer 3.0 M.I. Nucrel 403 | — | — | — | 17.0 | — | — | 8.0 |
| Talc | 10.0 | 10.0 | 10.0 | 10.0 | 10.0 | 10.0 | 10.0 |
| Flexural Modulus, PSI ASTM D 790 | 43,000 | 35,000 | 46,000 | 45,000 | 39,000 | 43,000 | 44,000 |
| Initial Adhesion Test I | P | P | P | F(3) | P | F(6) | F(7) |

Chart IV gives examples of high flexural modulus compositions which possess a high receptivity toward automotive paints. At least 2.5% by weight of an ethylene-methacrylic acid copolymer or ethylene-acrylic acid copolymer is required to achieve good initial paint adhesion to parts molded from these compositions.

CHART IV

| | | | | |
|---|---|---|---|---|
| Polypropylene 12 MFR Random Copolymer 2–4% Ethylene | — | — | — | — |
| Polypropylene 12 MFR Homopolymer | 11.7 | 11.9 | 11.9 | 11.9 |
| Ethylene-Propylene Elastomer, 1.5 MFR 70% Ethylene | 12.0 | 17.0 | 17.0 | 17.0 |
| Ethylene-Methacrylic Acid Copolymer, 25 M.I. Nucrel 925 | 5.0 | 5.0 | 2.5 | — |
| Milled Glass | — | — | — | — |
| High Density Polyethylene 0.960 g/cc, 1.0 M.I. | 5.0 | 5.0 | 5.0 | 5.0 |
| Styrene-Maleic Anhidride Copolymer | 1.0 | 0.5 | 0.5 | 0.5 |
| Quaternary Ammonium Surfactant | 0.3 | 0.6 | 0.6 | 0.6 |
| Polypropylene Acrylic Acid Graft Copolymer | 20.0 | 20.0 | 22.5 | 25.0 |
| Talc | 45.0 | 40.0 | 40.0 | 40.0 |
| Gardner Impact −30° C., In. Lbs ASTM D-3029 | 116 | 144 | 145 | 154 |
| Tensile Strength, ⅛" Thick Bar, PSI | 2500 | 2200 | 2200 | 2300 |
| Flexural Modulus, PSI ASTM D 790 | 356,000 | 224,000 | 229,000 | 250,000 |
| Solvent Resistance Test II | >20 | >20 | >20 | >20 |
| Humidity Resistance Test III | P | P | F Small Blisters | F |
| Initial Adhesion Test I | P | P | P | F |

Chart V demonstrates that good initial paint adhesion can be achieved using high levels of crystalline polypropylene homopolymers and copolymers.

CHART V

| | | | | | |
|---|---|---|---|---|---|
| Polypropylene 12 MFR Random Copolymer 2–4% Ethylene | 75.0 | 85.0 | — | — | — |
| Polypropylene 12 MFR Homopolymer | — | — | 70.0 | 76.0 | 78.0 |
| Ethylene-Propylene Elastomer, 1.5 MFR 70% Ethylene | 15.6 | 7.5 | 20.1 | 14.1 | 13.1 |
| Ethylene-Methacrylic Acid Copolymer, 25 M.I. Nurel 925 | 8.0 | 6.1 | 8.5 | 8.5 | 7.5 |
| Styrene-Maleic Anhydride Copolymer | 1.0 | 1.0 | 1.0 | 1.0 | 1.0 |
| Quaternary Ammonium Surfactant | 0.4 | 0.4 | 0.4 | 0.4 | 0.4 |
| Initial Adhesion Test I | P | P | P | P | F |

Chart VI demonstrates that certain ionomer resins such as DuPont Surlyn can be used as a substitute for component (A) in some cases. Surlyn resins are based upon copolymers of ethylene and methacrylic acid. Different grades are manufactured by reacting to varying degrees the carboxylic acid with either sodium or zinc salts. Such resins with very low sodium or zinc concentrations probably perform in a manner similar to the unneutralized resins. The Surlyn resins evaluated here did not provide acceptable humidity resistance, probably because of high levels of sodium and zinc salts. Also unlike the ethylene-methacrylic acid copolymers in component (A), low 1.0–2.0 M.I. Surlyn resins were required to achieve any level of adhesion at all. High M.I. resins Surlyn 8660 (10.0) and Surlyn 9970 (14.0) resulted in little or no initial adhesion.

CHART VI

| | | | | | | | | | |
|---|---|---|---|---|---|---|---|---|---|
| Polypropylene 12 MFR Random Copolymer 2–4% Ethylene | 34.1 | 34.1 | 34.1 | 34.1 | 34.1 | 34.1 | 34.1 | 34.1 | 34.1 |
| Polypropylene 12 MFR Homopolymer | 10.0 | 10.0 | 10.0 | 10.0 | 10.0 | 10.0 | 10.0 | 10.0 | 10.0 |
| Ethylene-Propylene Elastomer, 1.5 MFR 70% Ethylene | 23.9 | 23.9 | 23.9 | 23.9 | 23.9 | 23.9 | 23.9 | 18.9 | 18.9 |
| Ethylene-Methacrylic Acid Copolymer, 25 M.I. Nucrel 925 | — | — | — | — | — | — | — | 15.0 | 10.0 |
| Milled Glass | 8.0 | 8.0 | 8.0 | 8.0 | 8.0 | 8.0 | 8.0 | 8.0 | 8.0 |
| High Density Polyethylene 0.960 g/cc, 1.0 M.I. | 8.0 | 8.0 | 8.0 | 8.0 | 8.0 | 8.0 | 8.0 | 8.0 | 8.0 |
| Styrene-Maleic Anhydride Copolymer | 0.6 | 0.6 | 0.6 | 0.6 | 0.6 | 0.6 | 0.6 | 0.6 | 0.6 |
| Quaternary Ammonium Surfactant | 0.4 | 0.4 | 0.4 | 0.4 | 0.4 | 0.4 | 0.4 | 0.4 | 0.4 |
| Surlyn 8020 | 15.0 | — | — | — | — | — | — | — | — |
| Surlyn 8528 | — | 15.0 | — | — | — | — | 10.0 | — | — |
| Surlyn 8660 | — | — | 15.0 | — | — | — | — | — | 10.0 |
| Surlyn 9020 | — | — | — | 15.0 | — | — | — | — | — |

-continued

CHART VI

|  |  |  |  |  |  |  |  |  |
|---|---|---|---|---|---|---|---|---|
| Surlyn 9721 | — | — | — | — | 15.0 | — | — | — | — |
| Surlyn 9970 | — | — | — | — | — | 15.0 | — | — | — |
| Flexural Modulus, ASTM D-790, PSJ | 36,000 | 44,000 | 44,000 | 38,000 | 44,000 | 40,000 | 41,000 | 45,000 | 44,000 |
| Initial Adhesion Test I | P | P | F | P | P | F | P | P | P |
| Humidity Resistance Test III | F | F | F | F | F | F | P | P | P |

Chart VII demonstrates the use of LDPE and HDPE in several formulas. To modify physical properties paint adhesion is maintained so long as the melt index of the PE is in the range of 0.1 to 20.0 and preferably 0.8 to 10.0.

Chart VIII demonstrates the use of a styrene-butadiene elastomer as component B.

CHART VIII

| | | | | | |
|---|---|---|---|---|---|
| Polypropylene 12 MFR Random Copolymer 2–4% Ethylene | 10.0 | 10.0 | 10.0 | 10.0 | 10.0 |
| Polypropylene 12 MFR Homopolymer | 11.1 | 11.1 | 11.1 | 11.1 | 11.1 |
| Ethylene-Propylene Elastomer, 1.5 MFR 70% Ethylene | 17.0 | 7.0 | — | 12.0 | — |
| Ethylene-Methacrylic Acid Copolymer, 25 M.I. Nurel 925 | 13.0 | 13.0 | 13.0 | 13.0 | 13.0 |
| Styrene-Butadiene Copolymer 58% Styrene Milled Glass | — | — | — | 5.0 | 17.0 |
| High Density Polyethylene 0.960 g/cc, 1.0 M.I. | 20.0 | 20.0 | 20.0 | 20.0 | 20.0 |
| Styrene-Maleic Anhydride Copolymer | 0.6 | 0.6 | 0.6 | 0.6 | 0.6 |
| Quaternary Ammonium Surfactant | 0.2 | 0.2 | 0.2 | 0.2 | 0.2 |
| Polypropylene Acrylic Acid Graft Copolymer | 8.0 | 8.0 | 8.0 | 8.0 | 8.0 |
| Talc | 20.0 | 20.0 | 20.0 | 20.0 | 20.0 |
| Styrene-Butadiene Copolymer 30% By W.T. Styrene Mooney Viscosity 25–35 | 0 | 10.0 | 17.0 | — | — |
| Gardner Impact −30° C., In. Lbs ASTM D-3029 | 296 | 240 | 192 | 272 | 88 |
| Tensile Strength, ⅛" Thick Bar, PSI | 2500 | 2600 | 2900 | 2400 | 2700 |
| Flexural Modulus, PSI ASTM D 790 | 176,000 | 196,000 | 201,000 | 173,000 | 206,000 |
| Peel Strength Test IV "NP" Means Paint Cannot Be Removed | NP | NP | NP | NP | NP |
| Solvent Resistance Test II | P | P | P | P | P |
| Humidity Resistance Test III | P | P | P | P | P |
| Initial Adhesion Test I | P | P | P | P | P |

Chart IX demonstrates the performance of blends having little or no polypropylene component.

CHART VII

| | | | | | | | |
|---|---|---|---|---|---|---|---|
| Polypropylene 12 MFR Random Copolymer 2–4% Ethylene | 10.0 | 10.0 | 10.0 | 10.0 | 10.0 | 10.0 | 10.0 |
| Polypropylene 12 MFR Homopolymer | 11.1 | 11.1 | 11.1 | 11.1 | 11.1 | 11.1 | 11.1 |
| Ethylene-Propylene Elastomer, 1.5 MFR 70% Ethylene | 17.0 | 17.0 | 17.0 | 17.0 | 17.0 | 12.0 | 7.0 |
| Ethylene-Methacrylic Acid Copolymer, 25 M.I. Nucrel 925 | 13.0 | 13.0 | 13.0 | 13.0 | 13.0 | 13.0 | 13.0 |
| Union Carbide SLGA 1041 LLDPE | 0 | 3.0 | 5.0 | 8.0 | 10.0 | 5.0 | 10.0 |
| High Density Polyethylene 0.960 g/cc, 1.0 M.I. | 20.0 | 17.0 | 15.0 | 12.0 | 10.0 | 20.0 | 20.0 |
| Styrene-Maleic Anhydride Copolymer | 0.6 | 0.6 | 0.6 | 0.6 | 0.6 | 0.6 | 0.6 |
| Quaternary Ammonium Surfactant | 0.3 | 0.3 | 0.3 | 0.3 | 0.3 | 0.3 | 0.3 |
| Polypropylene Acrylic Acid Graft Copolymer | 8.0 | 8.0 | 8.0 | 8.0 | 8.0 | 8.0 | 8.0 |
| Talc | 20.0 | 20.0 | 20.0 | 20.0 | 20.0 | 20.0 | 20.0 |
| Gardner Impact −30° C., In. Lbs ASTM D-3029 | 296 | 312 | 304 | 312 | 288 | 256 | 224 |
| Tensile Strength, ⅛" Thick Bar, PSI | 2300 | 2100 | 2000 | 1900 | 1800 | 2300 | 2300 |
| Flexural Modulus, PSI ASTM D 790 | 150,000 | 143,000 | 128,000 | 116,000 | 112,000 | 160,000 | 177,000 |
| Peel Strength Test IV "NP" Means Paint Cannot Be Removed | NP | NP | NP | NP | NP | NP | NP | NP |
| Solvent Resistance Test II | P | P | P | P | P | P | P | P |
| Humidity Resistance Test III | P | P | P | P | P | P | P | P |
| Initial Adhesion Test I | P | P | P | P | P | P | P | P |

| CHART IX | | |
|---|---|---|
| Polypropylene 12 MFR Random Copolymer 2-4% Ethylene | — | — |
| Polypropylene 12 MFR Homopolymer | — | — |
| Ethylene-Propylene Elastomer, 1.5 MFR 70% Ethylene | 15.0 | 15.0 |
| Ethylene-Methacrylic Acid Copolymer, 25 M.I. Nurel 925 | 13.0 | 13.0 |
| Milled Glass | — | — |
| High Density Polyethylene 0.960 g/cc, 1.0 M.I. | 41.2 | 41.2 |
| Styrene-Maleic Anhydride Copolymer | 0.6 | 0.6 |
| Quaternary Ammonium Surfactant | 0.2 | 0.2 |
| Polypropylene Acrylic Acid Graft Copolymer | — | 10.0 |
| Talc | 30.0 | 20.0 |
| Gardner Impact −30° C., In. Lbs ASTM D-3029 | 320 | 320 |
| Tensile Strength, ⅛" Thick Bar, PSI | 2500 | 2300 |
| Flexural Modulus, PSI ASTM D 790 | 151,000 | 143,000 |
| Peel Strength Test IV "NP" Means Paint Cannot Be Removed | NP | NP |
| Solvent Resistance Test II | P | P |
| Humidity Resistance Test III | P | P |
| Initial Adhesion Test I | P | P |

Chart X demonstrates that elimination of the adhesion promoter results in painted parts having dramatically improved gasoline and solvent resistance.

| CHART X | | | | |
|---|---|---|---|---|
| Polypropylene 12 MFR Homopolymer | 32.0 | 32.0 | 32.0 | 32.0 |
| Ethylene-Propylene Elastomer, 1.5 MFR 70% Ethylene | 15.0 | 15.0 | 28.0 | 28.0 |
| Ethylene-Methacrylic Acid Copolymer, 25 M.I. Nurel 925 | 13.0 | 13.0 | — | — |
| Milled Glass | — | — | — | — |
| High Density Polyethylene 0.960 g/cc, 1.0 M.I. | 20.0 | 20.0 | 20.0 | 20.0 |
| Talc | 20.0 | 20.0 | 20.0 | 20.0 |
| Adhesion Promoter + Top Coat | x | | x | |
| Top Coat Only | | x | | x |
| Solvent Resistance Test II | 3 | 20 | 3 | 3 |
| Humidity Resistance Test III | P | P | P | F |
| Initial Adhesion Test I | P | P | P | F |

We claim:

1. A thermoplastic composition comprising:
(a) about 2 to 25 weight percent of a copolymer having a melt index of between 0.5 and 1500 and derived from
  (i) about 70 to 95 weight percent of ethylene and
  (ii) about 5 to 30 weight percent of an ethylenically unsaturated carboxylic acid;
(b) about 3 to 50 weight percent of an elastomeric copolymer derived from
  (i) ethylene and
  (ii) a $C_3$ and $C_{12}$ alpha-olefin;
(c) an amount up to about 55 weight percent of a crystalline polymer, said amount being sufficient to enable the thermoplastic composition to withstand an oven bake temperature of greater than 180° F., said polymer having a flow rate of up to about 30 and selected from one or more of the group consisting of
  (i) a homopolypropylene,
  (ii) a polypropylene onto which has been grafted up to about 12 weight percent of an ethylenically unsaturated carboxylic acid, and
  (iii) a copolymer of
    (1) propylene and
    (2) up to about 20 mole percent of a $C_2$ to $C_{12}$ alpha-olefin;
(d) about 5 to 50 weight percent of an inorganic filler; and
(e) about 10 to 35 weight percent of a polymer having a melt index of between about 0.1 and 20 and selected from one or more of the group consisting of
  (i) homopolyethylene and
  (ii) a copolymer of
    (1) ethylene and
    (2) one or more of the group consisting of
      (A) a $C_3$ to $C_{12}$ alpha-olefin,
      (B) a salt of an unsaturated carboxylic acid, and
      (C) an ester of an unsaturated carboxylic acid.

2. A composition according to claim 1 comprising:
(a) about 10 to 15 weight percent of an ethylene-methacrylic acid copolymer having a melt index of between 10 and 300;
(b) about 20 to 25 weight percent of an ethylene-propylene rubber;
(c)
  (i) about 10 to 15 weight percent of polypropylene having a melt flow rate of between 10 and 15,
  (ii) about 5 to 10 weight percent of an acrylic acid grafted polypropylene, and
  (iii) about 15 to 20 weight percent of a copolymer of
    (1) about 95 to 99 mole percent propylene and
    (2) about 1 to 5 mole percent ethylene,
(d) about 5 to 15 weight percent talc; and
(e)
  (i) about 3 to 15 weight percent high density polyethylene, and
  (ii) about 5 to 15 weight percent of a copolymer of
    (1) ethylene and
    (2) a metal salt of methacrylic acid.

3. A composition according to claim 1 comprising:
(a) about 10 to 15 weight percent of an ethylene-methacrylic acid copolymer having a melt index of between 10 and 300;
(b) about 15 to 20 weight percent of an ethylene-propylene rubber;
(c)
  (i) about 10 to 15 weight percent of polypropylene having a melt flow rate of between 10 and 15,
  (ii) about 5 to 10 weight percent of an acrylic acid grafted polypropylene, and
  (iii) about 5 to 15 weight percent of a copolymer of
    (1) about 95 to 99 mole percent propylene, and
    (2) about 1 to 5 mole percent ethylene,
(d) about 15 to 25 weight percent talc; and
(e) about 15 to 25 weight percent high density polyethylene.

4. A composition according to claim 1 comprising:
(a) about 2 to 15 weight percent of an ethylene-methacrylic acid copolymer having a melt index of between 10 and 300;
(b) about 3 to 15 weight percent of an ethylene-propylene rubber;
(c)
  (i) about 1 to 5 weight percent of polypropylene having a melt flow rate of between 10 and 15,
  (ii) about 5 to 25 weight percent of an acrylic acid grafted polypropylene;
(d) about 40 to 50 weight percent talc; and (e) about 15 to 25 weight percent high density polyethylene.

5. A composition according to claim 2, 3 or 4, further comprising:
   (f) about 0.5 to 1.0 weight percent styrene-maleic anhydride copolymer;
   (g) about 0.1 to 0.2 weight percent nucleating agent;
   (h) about 0.1 to 0.5 weight percent quarternary ammonium surfactant;
   (i) about 0.1 to 1.0 weight percent antioxidant; and
   (j) from 0 to about 0.50 weight percent titanate coupling agent.

6. A shaped article made from a thermoplastic composition according to claim 1.

7. An article according to claim 6 having one or more painted surfaces.

8. A shaped article made from a thermoplastic composition according to claim 3.

9. An article according to claim 8 having one or more painted surfaces.

10. A shaped article made from a thermoplastic composition according to claim 4.

11. An article according to claim 10 having one or more painted surfaces.

12. A shaped article made from a thermoplastic composition according to claim 5.

13. An article according to claim 12 having one or more painted surfaces.

14. A thermoplastic composition comprising:
   (a) about 2 to 25 weight percent of a copolymer having a melt index of between 1.0 and less than 2.0 and derived from
      (i) about 70 to 95 weight percent of ethylene and
      (ii) about 5 to 30 weight percent of a salt of an ethylenically unsaturated carboxylic acid;
   (b) about 3 to 50 weight percent of an elastomeric copolymer derived from
      (i) ethylene and
      (ii) a $C_3$ to $C_{12}$ alpha-olefin;
   (c) an amount up to about 55 weight percent of a crystalline polymer, said amount being sufficient to enable the thermoplastic composition to withstand an oven bake temperature of greater than 180° F., said polymer having a flow rate of up to about 30 and selected from one or more of the group consisting of
      (i) a homopolypropylene,
      (ii) a polypropylene onto which has been grafted up to about 12 weight percent of an ethylenically unsaturated carboxylic acid, and
      (iii) a copolymer of
         (1) propylene and
         (2) up to about 20 mole percent of a $C_2$ to $C_{12}$ alpha-olefin;
   (d) about 5 to 50 weight percent of an inorganic filler; and
   (e) about 10 to 35 weight percent of a polymer having a melt index of between about 2.0 and 20 and selected from one or more of the group consisting of
      (i) homopolyethylene and
      (ii) a copolymer of
         (1) ethylene and
         (2) one or more of the group consisting of
            (A) a $C_3$ and $C_{12}$ alpha-olefin,
            (B) a salt of an unsaturated carboxylic acid and
            (C) an ester of an unsaturated carboxylic acid.

15. A thermoplastic composition according to claim 14 wherein the component (a)(ii) is selected from one or more of the group consisting of sodium and zinc salts of methacrylic acid.

16. A composition according to claim 15 comprising:
   (a) about 10 to 15 weight percent of an ethylene-zinc methacrylate copolymer;
   (b) about 20 to 25 weight percent of an ethylene-propylene rubber;
   (c)
      (i) about 10 to 15 weight percent of polypropylene having a melt flow rate of between 10 and 15,
      (ii) about 5 to 10 weight percent of an acrylic acid grafted polypropylene, and
      (iii) about 15 to 20 weight percent of a copolymer of
         (1) about 95 to 99 mole percent propylene and
         (2) about 1 to 5 mole percent ethylene,
   (d) about 5 to 15 weight percent talc; and
   (e)
      (i) about 3 to 15 weight percent high density polyethylene, and
      (ii) about 5 to 15 weight percent of a copolymer of
         (1) ethylene and
         (2) a metal salt of methacrylic acid.

17. A composition according to claim 14 comprising:
   (a) about 10 to 15 weight percent of an ethylene-zinc methacrylate copolymer;
   (b) about 15 to 20 weight percent of an ethylene-propylene rubber;
   (c)
      (i) about 10 to 15 weight percent of polypropylene having a melt flow rate of between 10 and 15,
      (ii) about 5 to 10 weight percent of an acrylic acid grafted polypropylene, and
      (iii) about 5 to 15 weight percent of a copolymer of
         (1) bout 95 to 99 mole percent propylene, and
         (2) about 1 to 5 mole percent ethylene,
   (d) about 15 to 25 weight percent talc; and
   (e) about 15 to 25 weight percent high density polyethylene.

18. A composition according to claim 14 comprising:
   (a) about 2 to 15 weight percent of an ethylene-zinc methacrylate copolymer;
   (b) about 3 to 15 weight percent of an ethylene-propylene rubber;
   (c)
      (i) about 1 to 5 weight percent of polypropylene having a melt flow rate of between 10 and 15,
      (ii) about 5 to 25 weight percent of an acrylic acid grafted polypropylene;
   (d) about 40 to 50 weight percent talc; and
   (e) about 15 to 25 weight percent high density polyethylene.

19. A composition according to claim 16, 17 or 18, further comprising:
   (f) about 0.5 to 1.0 weight percent styrene-maleic anhydride copolymer;
   (g) about 0.1 to 0.2 weight percent nucleating agent;
   (h) about 0.1 to 0.5 weight percent quarternary ammonium surfactant;
   (i) about 0.1 to 1.0 weight percent antioxidant; and
   (j) from 0 to about 0.50 weight percent titanate coupling agent.

20. A shaped article made from a thermoplastic composition according to claim 14.

21. An article according to claim 20 having one or more painted surfaces.

22. A shaped article made from a thermoplastic composition according to claim 17.

23. An article according to claim 22 having one or more painted surfaces.

24. A shaped article made from a thermoplastic composition according to claim 18.

25. An article according to claim 24 having one or more painted surfaces.

26. A shaped article made from a thermoplastic composition according to claim 19.

27. An article according to claim 26 having one or more painted surfaces.

* * * * *

UNITED STATES PATENT AND TRADEMARK OFFICE
CERTIFICATE OF CORRECTION

PATENT NO. : 4,945,005  Page 1 of 3

DATED : July 31, 1990

INVENTOR(S) : John F. Aleckner, Jr. et al.

It is certified that error appears in the above-identified patent and that said Letters Patent is hereby corrected as shown below:

ON THE TITLE PAGE:

In the Related U.S. Application Data: change "PCT US86/00315 on Feb. 21, 1986" to -- PCT US86/00315 on Feb. 19, 1986 --, and change "Ser. No. 703,833 filed Feb. 19, 1986" to -- Ser. No. 703,833 filed Feb 21, 1985 --.

In the Abstract, at line 4: change "for example" to -- for example, --.

At column 3, line 40: change "carboxcylic" to -- carboxylic --.

At column 5, line 39: change "to 300" to -- and 300 --.

At column 8, line 2: change "a" to -- addition --.

At column 8, line 48: after "additives" insert -- and --.

At column 10, line 4: change "tolulene" to -- toluene --.

At column 10, line 10: after "allowed" insert -- to --.

Column 12:
At chart II, row 18: change the row of figures from "320 280 280 200 240" to -- 320 280 180 200 240 --.

At column 12, in the description of Chart III: change "ethylene-methcrylic" to -- ethylene-methacrylic --.

UNITED STATES PATENT AND TRADEMARK OFFICE
CERTIFICATE OF CORRECTION

PATENT NO. : 4,945,005

DATED : July 31, 1990

INVENTOR(S) : John F. Aleckner, Jr. et al.

Page 2 of 3

It is certified that error appears in the above-identified patent and that said Letters Patent is hereby corrected as shown below:

At Chart I, last row: change "Intial Adhesion Test I" to -- Initial Adhesion Test I --.

At Chart IV, row 13: change "Stvrene-Maleic Anhidride" to -- Styrene-Maleic Anhydride --.

At Chart V, line 8: change "Nurel" to -- Nucrel --.

At column 14, line 50: change "(14.0" to -- (14.0) --.

At Chart VI, row 15: change the end of the row of figures from "10.0 - " to -- 10.0 - - --.

At Chart VIII, row 7: change "Nurel" to -- Nucrel --.

At Chart VIII, row 19: change "Visocity" to -- Viscosity --.

At Chart VII, row 8: change "LLDPE" to -- LDPE --.

At Chart IX, row 7: change "Nurel" to -- Nucrel --.

At Chart X, row 5: change "Nurel" to -- Nucrel --.

At claim 5, line 6: change "quarternary" to -- quaternary --.

At claim 17, line 12: change "bout" to -- about --.

UNITED STATES PATENT AND TRADEMARK OFFICE
CERTIFICATE OF CORRECTION

PATENT NO. : 4,945,005

DATED : July 31, 1990

INVENTOR(S) : John F. Aleckner, Jr. et al.

It is certified that error appears in the above-identified patent and that said Letters Patent is hereby corrected as shown below:

COLUMN 20

At claim 19, line 6: change "quarternary" to -- quaternary --.

At the Assignee listing on the title page: change the listed assignee from "Dexter Corporation, Windsor Locks, Conn." to -- DIS, Grand Prairie, Texas --.

Signed and Sealed this

Twenty-seventh Day of October, 1992

Attest:

DOUGLAS B. COMER

*Attesting Officer*     *Acting Commissioner of Patents and Trademarks*